United States Patent
Li et al.

(10) Patent No.: US 11,589,019 B2
(45) Date of Patent: Feb. 21, 2023

(54) PROJECTION METHOD AND PROJECTION APPARATUS

(71) Applicant: IVIEW DISPLAYS (SHENZHEN) COMPANY LTD., Shenzhen (CN)

(72) Inventors: Wenxiang Li, Shenzhen (CN); Mingnei Ding, Shenzhen (CN); Steve Yeung, Shenzhen (CN); Zhiqiang Gao, Shenzhen (CN)

( * ) Notice: Subject to any disclaimer, the term of this patent is extended or adjusted under 35 U.S.C. 154(b) by 0 days.

(21) Appl. No.: 17/399,987

(22) Filed: Aug. 11, 2021

(65) Prior Publication Data
US 2022/0053172 A1 Feb. 17, 2022

(30) Foreign Application Priority Data
Aug. 13, 2020 (CN) .......................... 202010812447.4

(51) Int. Cl.
| H04N 9/31 | (2006.01) |
| G03B 21/14 | (2006.01) |
| G03B 21/28 | (2006.01) |
| G03B 21/53 | (2006.01) |
| G03B 21/56 | (2006.01) |
| G03B 17/54 | (2021.01) |

(52) U.S. Cl.
CPC .......... H04N 9/317 (2013.01); G03B 21/142 (2013.01); G03B 21/28 (2013.01); G03B 21/53 (2013.01); G03B 21/56 (2013.01); G03B 17/54 (2013.01); H04N 9/3176 (2013.01)

(58) Field of Classification Search
CPC ........ G03B 21/28; G03B 21/53; G03B 21/56; G03B 21/142; G03B 21/147; H04N 9/317; H04N 9/3176; H04N 9/3185; H04N 9/3194
See application file for complete search history.

(56) References Cited

U.S. PATENT DOCUMENTS

| 8,111,949 B2 * | 2/2012 | Sakurai | H04N 1/40068 382/318 |
| 9,160,993 B1 * | 10/2015 | Lish | G06F 3/0488 |
| 11,127,212 B1 * | 9/2021 | Wilens | G06V 20/64 |
| 2009/0040472 A1 * | 2/2009 | Wakita | G03B 21/10 353/69 |
| 2012/0256824 A1 * | 10/2012 | Mizunuma | G06F 3/04886 345/156 |
| 2015/0323859 A1 * | 11/2015 | Fujikawa | G03B 21/10 353/79 |
| 2016/0191868 A1 | 6/2016 | Fujiune | |

FOREIGN PATENT DOCUMENTS

CN 111163365 A 5/2020

* cited by examiner

Primary Examiner — Sultan Chowdhury
(74) Attorney, Agent, or Firm — Jade IP Consulting; Victoria Bennett

(57) ABSTRACT

The present disclosure relates to the technical field of digital projection display, and discloses a projection method and a projection apparatus. The method includes: acquiring a target object image; identifying attribute information of a target object based on the target object image; acquiring preset projection content based on the attribute information of the target object; acquiring a projection path; and projecting a projection screen based on the preset projection content and controlling the projection screen to move along the projection path. In this way, the projection is more flexible and more pertinent.

9 Claims, 4 Drawing Sheets

PROJECTION METHOD AND PROJECTION APPARATUS

This application is based upon and claims priority to Chinese Patent Application No. 2020108124474, filed before China National Intellectual Property Administration on Aug. 13, 2020 and entitled "PROJECTION METHOD AND PROJECTION APPARATUS" the entire contents of which are incorporated herein by reference.

TECHNICAL FIELD

The present disclosure relates to the technical field of digital projection display, and in particular, relates to a projection method and a projection apparatus.

BACKGROUND

With the rapid development of the semiconductor display technologies, various portable electronic devices are being continuously designed and manufactured. Wide application of the portable electronic devices pushes requirements of the users on display devices to develop towards miniaturization, high resolution, and movability.

Under such intense demands, projection technologies have got rapid development, and varieties of small-size and high-performance portable projectors have been placed into the market. At present, various application scenarios need motion projection, such as, families, shopping malls, traffic, large-scale stages, and the like, such that an immersive experience is created by combining motion with content.

However, the traditional motion projection solution is not mature. A traditional projector generally moves along a fixed moving path based on a preset program and projects fixed content, which thus lacks flexibility and pertinence.

SUMMARY

In view of the above technical problem, the present disclosure provides a projection method and a projection apparatus, such that projection is more flexible and more pertinent.

In one aspect, embodiments of the present disclosure provide a projection method, applicable to a projection apparatus. The method includes:
acquiring a target object image;
identifying attribute information of a target object based on the target object image;
acquiring preset projection content based on the attribute information of the target object;
acquiring a projection path; and
projecting a projection screen based on the preset projection content and controlling the projection screen to move along the projection path.

In some embodiments, the method further includes:
presetting a corresponding relationship among the attribute information of the target object, the projection content, and the projection path; and
acquiring the projection path comprises:
acquiring the projection path based on the attribute information of the target object and the corresponding relationship.

In some embodiments, acquiring the projection path includes:
randomly generating a projection path; or
acquiring a moving path of the target object, and acquiring the projection path based on the moving path.

In some embodiments, the projection path includes a key point, the key point including a starting point, a plurality of turning points, and a termination point;
the projection apparatus includes a motion control device, the motion control device being configured to move the projection screen; and
the method further includes:
presetting a rotation angle and a rotation speed of the motion control device corresponding to the key point.

In some embodiments, controlling the projection screen to move along the projection path includes:
controlling the projection screen to move along the projection path by controlling the rotation angle and the rotation speed of the motion control device.

In some embodiments, the projection apparatus includes a lighting device; and
the method further includes:
turning off the lighting device in response to the projection path being a projection path that is randomly generated, and in response to controlling the projection screen to move along the projection path that is randomly generated.

In some embodiments, the method further includes:
correcting the projection screen.

In some embodiments, correcting the projection screen includes:
conducting rotation correction, and automatic focusing to the projection screen.

In some embodiments, the projection apparatus includes a reflective mirror; and
conducting rotation correction to the projection screen includes:
conducting the rotation correction to the projection screen by controlling the reflective mirror to rotate along a direction perpendicular to the projection apparatus.

In some embodiments, the projection apparatus further includes a lens and a focusing device, the lens being connected to the focusing device;
the method further includes:
acquiring a corresponding relationship table by presetting a corresponding relationship between a projection distance and a focusing position of the lens; and
conducting automatic focusing to the projection screen comprises:
acquiring a position of the projection screen;
determining the projection distance based on the position of the projection screen;
inquiring the focusing position of a lens corresponding to the projection distance in the corresponding relationship table; and
controlling the focusing device to move the lens to the focusing position.

In a second aspect, embodiments of the present disclosure further provide a projection apparatus. The projection apparatus includes:
a projecting device and a motion control device, the motion control device being configured to control the projecting device to move;
the projecting device comprising a lighting device, an image acquiring device, a lens, a focusing device, a controller;
wherein the lighting device is configured to supply a light source;
the image acquiring device is configured to acquire a target object image;
the focusing device is connected to the lens, and configured to drive the lens to move to a focusing position;

the controller is connected to the lighting device, the image acquiring device, and the focusing device;

wherein the controller comprises:

at least one processor; and a memory communicably connected to the at least one processor; wherein the memory is configured to store at least one instruction executable by the at least one processor, wherein the at least one instruction, when executed by the at least one processor, causes the at least one processor to perform the method as described above.

In some embodiments, the projecting device includes a reflective mirror; wherein the reflective mirror is connected to the controller; and the reflective mirror is configured to conduct rotation correction to the projection screen.

In a third aspect, embodiments of the present disclosure further provide non-volatile computer-readable storage medium storing at least one computer-executable instruction, wherein the at least one computer-executable instruction, when executed by a processor, causes the processor to perform the method as described above.

As compared with the related art, the present disclosure achieves the following beneficial effects: With the projection method and the projection apparatus according to the embodiments of the present disclosure, a target object image is acquired; attribute information of a target object is identified based on the target object image; preset projection content is acquired based on the attribute information of the target object; a projection path is acquired to implement pertinent projection; and finally a projection screen is projected based on the preset projection content and the projection screen is controlled to move along the projection path. In this way, the projection is more flexible and more pertinent.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

DETAILED DESCRIPTION

For clearer descriptions of the objectives, technical solutions and advantages of the embodiments of the present disclosure clearer, the technical solutions according to the embodiments of the present disclosure are clearly and thoroughly described with reference to the accompanying drawings of the embodiments of the present disclosure. The described embodiments are merely exemplary ones, but are not all the embodiments of the present disclosure. Based on the embodiments of the present disclosure, all other embodiments derived by persons of ordinary skill in the art without any creative efforts shall fall within the protection scope of the present disclosure.

It should be noted that, in the absence of conflict, features in the embodiments of the present disclosure may be incorporated, which all fall within the protection scope of the present disclosure. In addition, although logic function module division is illustrated in the schematic diagrams of apparatuses, and logic sequences are illustrated in the flowcharts, in some occasions, steps illustrated or described by using modules different from the module division in the apparatuses or in sequences different from those illustrated. Further, the terms "first," "second," and "third" used in this text do not limit data and execution sequences, and are intended to distinguish identical items or similar items having substantially the same functions and effects.

Figure 1:
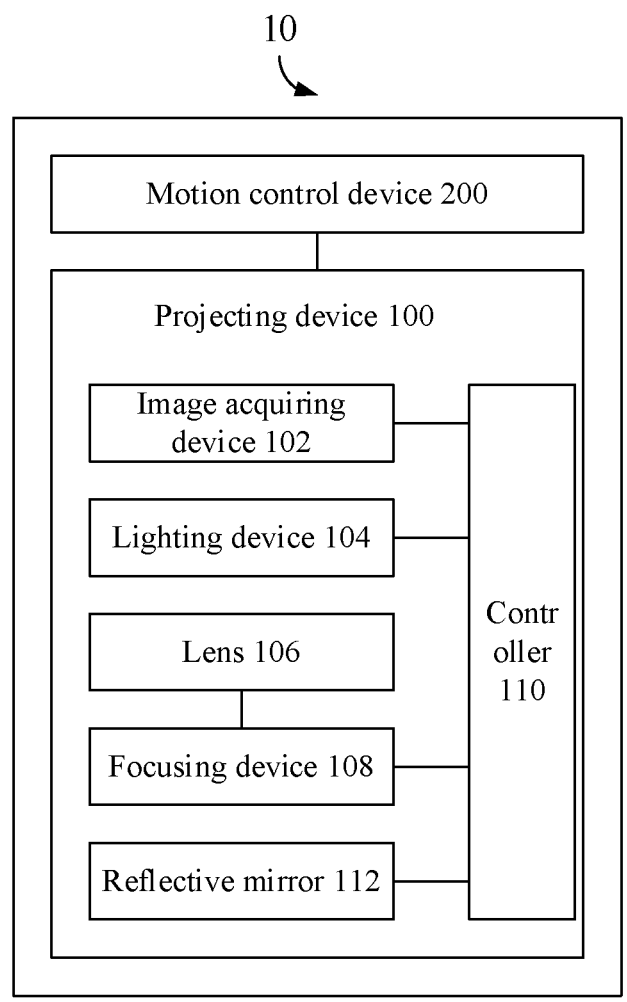
FIG. 1 is a schematic structural diagram illustrating hardware of a projecting apparatus according to an embodiment of the present disclosure.

An embodiment of the present disclosure provides a projection apparatus. Referring to FIG. 1, FIG. 1 is a schematic structural diagram illustrating hardware of a projection apparatus according to an embodiment of the present disclosure. The projection apparatus 10 includes a projecting device 100 and a motion control device 200. The projecting device 100 may be any type of device having a projection function, for example, a projector optical engine. The motion control unit 200 may be any type of device capable of rotating in horizontal and vertical directions, for example, a pan-tilt-zoom or a multi-dimensional motion platform. The motion control device 200 is configured to control the projecting device 100 to move.

In some embodiments, the projecting device 100 includes an image acquiring device 102, a lighting device 104, a lens 106, a focusing device 108, and a controller 110. The image acquiring device 102 is configured to acquire a target region image, and the image acquiring device 102 may be, for example, an infrared or visible light camera, or the like. Nevertheless, the image acquiring device 102 may also be a depth camera or a three-dimensional camera.

The lighting device 104 may be any type of device configured to supply a light source, for example, an LED lamp. The lens 106 may employ an industrial lens. The industrial lens has a powerful anti-interference capability. The focusing device 108 is connected to the lens 106. The focusing device 108 may be any type of device capable of driving the lens 106 to move.

The controller 110 is connected to the image acquiring device 102, the lighting device 104, and the focusing device 108. The controller 110 is configured to control the image acquiring device 102 to acquire a target object image, control the lighting device 104 to supply the light source, and control the focusing device 108 to drive the lens 106 to move to a focusing position.

In some embodiments, the projecting device 100 further includes a reflective mirror 112. Specifically, the reflective mirror 112 is mounted in front of the projecting device 100, wherein the reflective mirror 112 is configured to conduct rotation correction for the projection screen.

The projection method according to the embodiment of the present disclosure has wide application scenarios. Exemplarily, the method is applicable to a first application scenario: attracting customers in shopping malls. To be specific, the projecting apparatus may be disposed at the gate of a mall, and when detecting that people are entering, the projection apparatus projects different contents and moves to different shops. In this way, the objective of attracting the customers is achieved. For example, when detecting that a child is entering the mall, the projection apparatus may project toy screens and move to toy shops; or, when detecting that a lady is entering the mall, the projecting apparatus may project clothing and move to clothing shops.

The method is also applicable to a second application scenario: rushing for voucher-for-purchase. In the mall, in response to detecting many people, the projection apparatus may randomly select a place for screen projection and project a two-dimensional code of merchant promotion information. The customers scan the code and acquire the related promotion information, for example, acquiring a promotion or voucher by scanning the code. Since the projection position and the projection content are both random, and the customers need to rush for scanning the code, entertainment is enhanced, such that more customers are attracted to this game.

The method is also applicable to a third application scenario. In such scenarios where entrance of others is denied, upon detecting that others are entering, the projection apparatus projects alarm information and moves to follow these people, until they leave the detection region. Alternatively, at the crossing with no zebra, upon detecting that pedestrian are passing by the crossing, the projection apparatus projects virtual zebras and follows the pedestrian, until they safely pass by the crossing.

It should be noted that the method according to the embodiments of the present disclosure may be further extended to other suitable applicable environments, for example, a stage, an exhibition hall, traffic, or a shop, and is not limited to the application environment as illustrated in FIG. 1.

Figure 2:
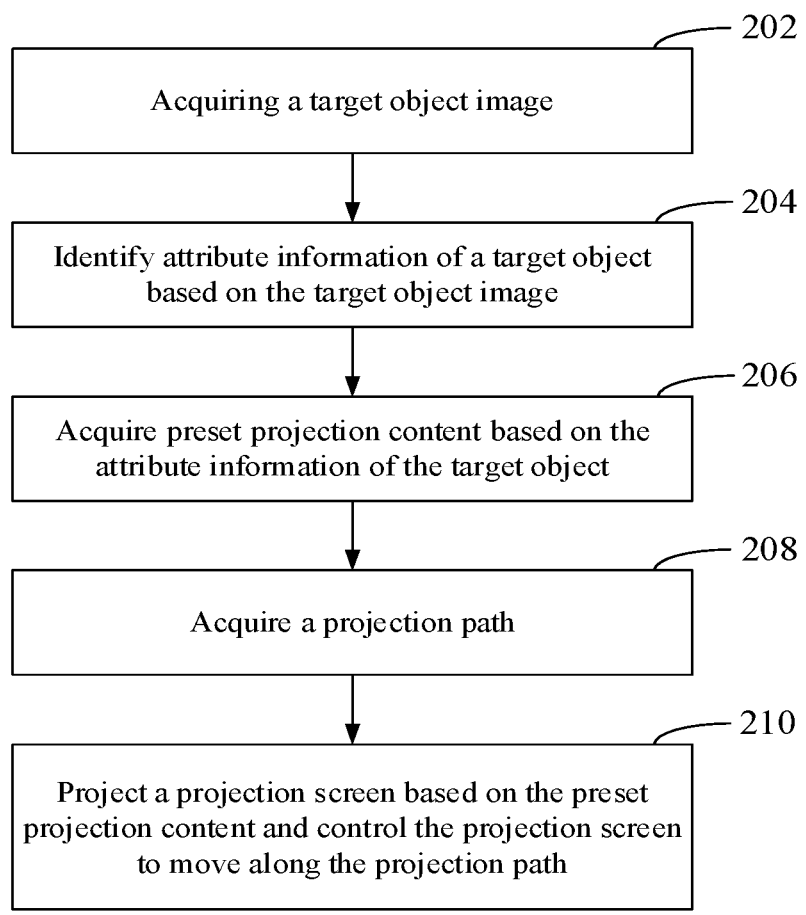
FIG. 2 is a schematic flowchart of a projection method according to an embodiment of the present disclosure.

As illustrated in FIG. 2, an embodiment of the present disclosure provides a projection method, applicable to a projection apparatus. The method is performed by a controller in the projection apparatus. The method includes:

In step 202, a target object image is acquired.

In an embodiment of the present disclosure, the projection apparatus is deployed in a target region, and the target region may be enclosed or open space; specifically, an infrared camera and/or a visible light camera and/or a depth camera may be placed in the target region, and the camera may be the camera at 180 degrees or greater than 180 degrees, such that all target object images may be acquired by a few image acquiring devices in the target region. When the target object is not detected within a period of time, the projection apparatus enters a standby state to save energy consumption.

In step 204, attribute information of a target object is identified based on the target object image.

In an embodiment of the present disclosure, the attribute information of the target object includes gender, age, clothing preference, and the like. Upon acquiring the target object image, the image acquiring device sends the target object image to the controller to enable a processor in the controller to process the target object image, such that the attribute information of the target object is determined. It may be understood that in some other embodiments, the image acquiring device may be directly used to process the target object image. To be specific, a software algorithm is configured in an image processing device, for example, a depth learning algorithm, and the attribute information of the target object is identified in combination with the depth learning algorithm.

It should be noted that, with respect to different application scenarios, different image acquiring devices aggregated to different depth learning networks may be used to identify the attribute information of the target object. Exemplarily, in the application scenario with an intense light environment, the depth camera cooperative with the depth learning networks may be used to identify the attribute information of the target object; or, in the application scenario with a weak light or full black environment, the infrared camera cooperative with the depth learning networks may be used to identify the attribute information of the target object. The depth learning networks may be acquired by training sample data collected based on actual application scenarios.

In step 206, preset projection content is acquired based on the attribute information of the target object.

Specifically, the preset projection content is projection content that is predefined, and if the attribute information of the target object is different, the corresponding projection content is also different. After the attribute information of the target object is determined, the preset projection content may be acquired based on the attribute information of the target object.

In step 208, a projection path is acquired.

In an embodiment of the present disclosure, the projection path may be understood as a moving path. The projection path may be acquired in three ways. Specifically, a corresponding relationship among the attribute information of the target object, the projection content, and the projection path is preset. Since the corresponding relationship has been set, the projection path may be acquired based on the attribute information of the target object and the corresponding relationship. The projection path is a clear moving path, which is illustrated, for example, the first application scenario. Specifically, a corresponding relationship table may be created based on the corresponding relationship among the attribute information of the target object, the projection content, and the projection path, and is stored in the memory of the projection apparatus; and during acquisition of a projection path, the projection path may be determined by inquiring the corresponding relationship table. For example, the relationship stored in the corresponding relationship table is that: the attribute information of the target object includes A1, A2, A3 . . . An, which respectively correspond to the projection contents C1, C2, C3 . . . Cn, and the projection paths P1, P2, P3 . . . Pn. After the attribute information of the target object is identified, the corresponding projection content and projection path are selected in the corresponding relationship table.

It should be noted that the corresponding relationship table may be a one-to-one mapping, or a one-to-multiple mapping. If the one-to-multiple mapping is used, a projection content and a moving path are randomly selected in practical projection.

Acquiring the projection path may further include randomly generating the projection path, that is, a spatial position is randomly selected for projection, which is illustrated, for example, the second application scenario. Alternatively, the moving path of the target object is acquired, and hence the projection path is acquired based on the moving path, which is illustrated, for example, the third application scenario.

In step 210, a projection screen is projected based on the preset projection content and the projection screen is controlled to move along the projection path.

Specifically, the projection screen may be a picture, a video, a Unity animation, or the like. After the preset projection content and the projection path are acquired, the projection screen may be projected based on the preset projection content and the projection screen may be controlled to move along the projection path. Further, the projection path includes key points, wherein the key points include a starting point, a plurality of turning points, and a termination point. Rotation angles and rotation speeds of the motion control device corresponding to the key points of the projection path are preset, wherein the rotation speed may be a default value. Exemplarily, using the rotation angle as an example for description, the rotation angle of the starting point is preset as $(\alpha_0, \beta_0)$, the rotation angle of the turning point 1 is preset as $(\alpha_1, \beta_1)$, the rotation angle of the turning point 2 is preset as $(\alpha_2, \beta_2)$, and the rotation angle of the termination point E is preset as $(\alpha_E, \beta_E)$. After the rotation angle and the rotation speed are preset, the projection screen may be controlled to move along the projection path by controlling the rotation angle and the rotation speed of the motion control device.

It may be understood that in some embodiments, the key point may not include turning point, but only include a starting point and a termination point. The key points may be customized according to the actual needs, which are not limited to the configuration in this embodiment.

In some embodiments, for reduction of power consumption and mitigate heat dissipation pressure, the lighting device is turned off in response to the projection path being a projection path that is randomly generated, and in response to controlling the projection screen to move along the projection path that is randomly generated; and the lighting device is turned on when the projecting device stops projection screen at a position and needs to project content.

In some other embodiments, since the projection screen may be tilted or deflected during the movement, the projection screen needs to be corrected. Further, rotation correction and automatic focusing are conducted to the projection screen. The rotation correction is directed to the projection apparatus equipped with a reflective mirror. Specifically, when the reflective mirror is controlled to rotate along a direction perpendicular to the projection apparatus, the projection screen may be rotated. Assuming that a rotation angle of the reflective mirror in the direction is a, then the projection screen needs to be rotated by a along the same direction, such that the projection screen remains to be opposite to the viewer.

In some embodiments, for sharpness of the projection screen, the corresponding relationship between the projection distance and the focusing position of the lens may be preset, such that the corresponding relationship table is acquired. In the corresponding relationship table, each projection distance may have a unique optimal lens position, such that the projection screen is the clearest. Specifically, the position of the projection screen is acquired, the projection distance is determined based on the position, and after the projection distance is acquired, the focusing position of the lens corresponding to the projection distance is inquired based on the corresponding relationship table, and finally, the focusing unit is controlled to move the lens to the focusing position to implement automatic focusing. In this way, it is ensured that the projection screen is clear.

It should be noted that in the above various embodiments, the steps are not subject to a definite order during execution, and persons of ordinary skill in the art would understand, based on the description of the embodiments of the present disclosure, in different embodiments, the above steps may be performed in different orders, that is, may be concurrently performed, or alternately performed.

Figure 3:
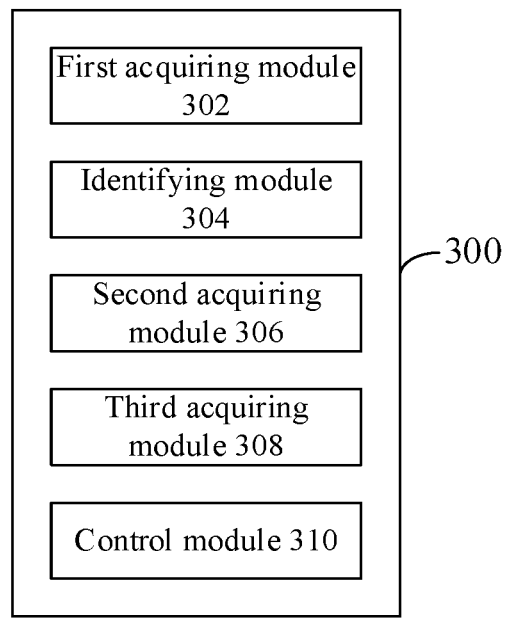
FIG. 3 is a schematic structural diagram of a projecting device according to an embodiment of the present disclosure.

Correspondingly, an embodiment of the present disclosure further provides a projection apparatus 300. As illustrated in FIG. 3, the projection apparatus 300 includes:

a first acquiring module 302, configured to acquire a target object image;

an identifying module 304, configured to identify attribute information of a target object based on the target object image;

a second acquiring module 306, configured to acquire preset projection content based on the attribute information of the target object;

a third acquiring module 308, configured to acquire a projection path;

a control module 310, configured to project a projection screen based on the preset projection content and control the projection screen to move along the projection path.

With the projection apparatus according to the embodiments of the present disclosure, the first acquiring module acquires a target object image; the identifying module identifies attribute information of a target object based on the target object image; the second acquiring module acquires preset projection content based on the attribute information of the target object; the third acquiring module acquires a projection path; and the control module projects a projection screen based on the preset projection content and controls the projection screen to move along the projection path. In this way, the projection is more flexible and more pertinent.

It should be noted that the above projection apparatus is capable of performing the projection method according to the embodiments of the present disclosure, has corresponding function modules for performing the method, and achieves the corresponding beneficial effects. For technical details that are not illustrated in detail in the apparatus embodiments, reference may be made to the description of the methods according to the embodiments of the present disclosure.

Figure 4:
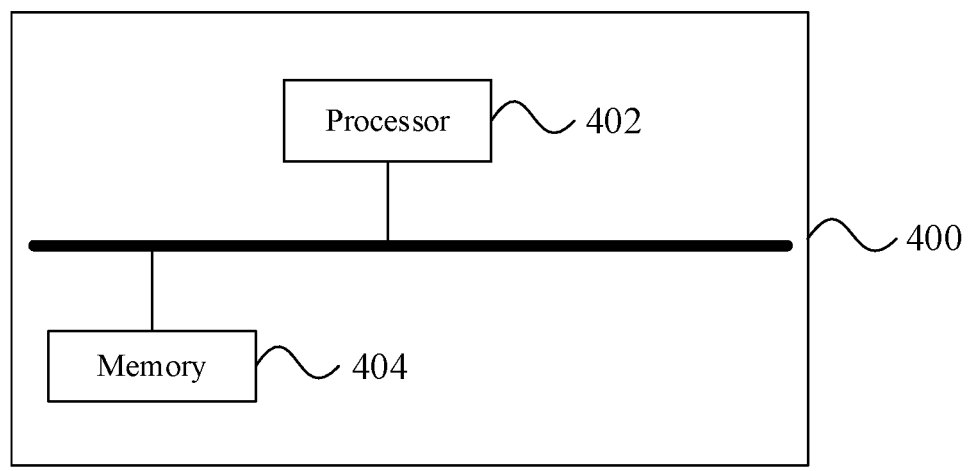
FIG. 4 is a schematic structural diagram illustrating hardware of a controller according to an embodiment of the present disclosure.

FIG. 4 is a schematic structural diagram illustrating hardware of a controller 400 according to an embodiment of the present disclosure.

As illustrated in FIG. 4, the controller 400 includes: one or more processors 402 and a memory 404, and FIG. 4 uses one processor 402 as an example.

The processor 402 and the memory 404 may be connected via a bus or in another manner, and FIG. 4 uses the bus as an example.

The memory 404, as a non-volatile computer-readable storage medium, may be configured to store non-volatile software programs, non-volatile computer-executable programs and modules, for example, the program instructions/modules corresponding to the projection method according to the embodiments of the present disclosure (for example, the first acquiring module 302, the identifying module 304, the second acquiring module 306, the third acquiring module 308, and the control module 310 as illustrated in FIG. 3). The non-volatile software programs, instructions and modules stored in the memory 404, when executed, cause the processor to perform various function applications and data processing of the projection apparatus, that is, performing the projection method according to the above method embodiments.

The memory 404 may include a program memory area and data memory area, wherein the program memory area may store operation systems and application programs needed by at least function; and the data memory area may store data created according to the use of the projection apparatus. In addition, the memory 404 may include a high-speed random access memory, or include a non-volatile memory, for example, at least one disk storage device, a flash memory device, or another non-volatile solid storage device. In some embodiments, the memory 404 optionally includes memories remotely configured relative to the processor 402. These memories may be connected to the projection apparatus over a network. Examples of the above network include, but not limited to, the Internet, Intranet, local area network, mobile communication network and a combination thereof.

One or more modules are stored in the memory 404, and when executed by the one or more controllers, perform the projection method according to any of the above method embodiments, for example, performing steps 202 to 210 in the method as illustrated in FIG. 2, and implementing the functions of the modules 302 to 310 as illustrated in FIG. 3.

The above described apparatus embodiments are merely for illustration purpose only. The units which are described as separate components may be physically separated or may be not physically separated, and the components which are illustrated as units may be or may not be physical units, that is, the components may be located in the same position or may be distributed into a plurality of network units. A part or all of the modules may be selected according to the actual needs to achieve the objectives of the technical solutions of the embodiments.

Figure 5:
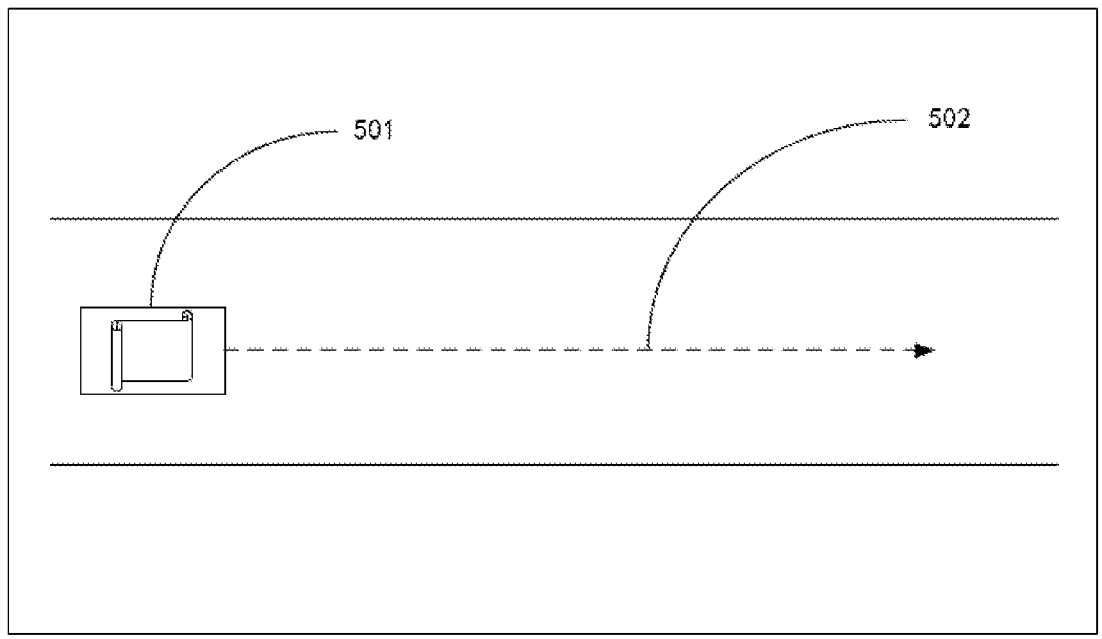
FIG. 5 is a schematic structural diagram illustrating controlling the projection image to move along the projection path according to an embodiment of the present disclosure.

FIG. 5 is a schematic structural diagram illustrating controlling the projection image to move along the projection path according to an embodiment of the present disclosure.

As illustrated in FIG. 5, the projection image 501 is controlled to move along the projection path 502.

Figure 6:
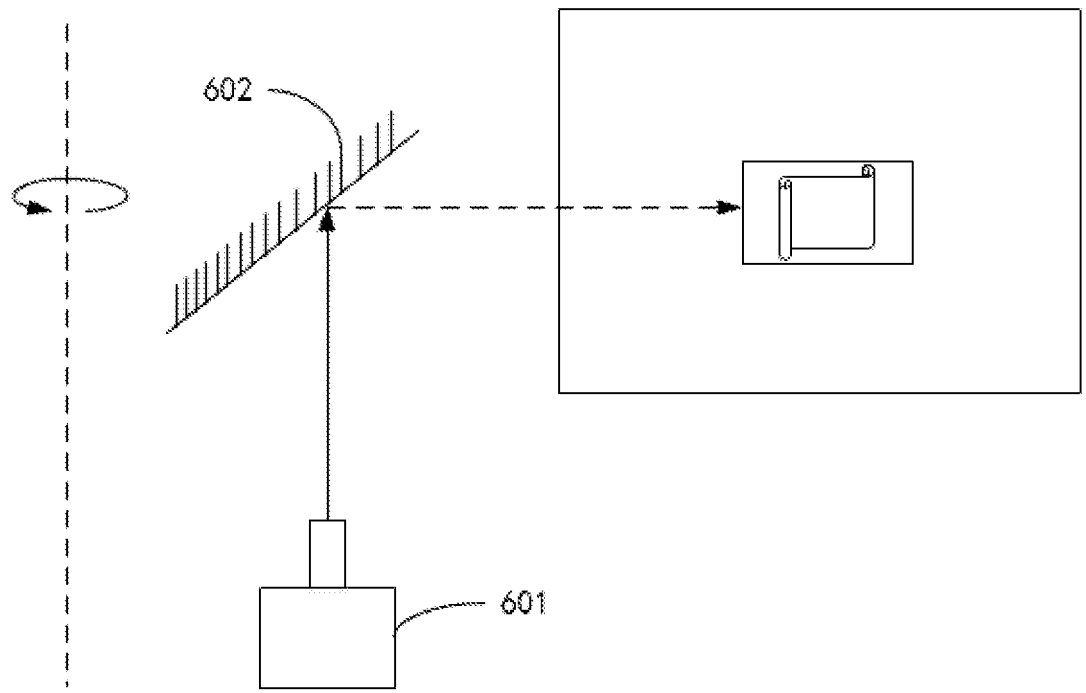
FIG. 6 is a schematic structural diagram illustrating the reflective mirror to rotate along a direction perpendicular to the projection apparatus according to an embodiment of the present disclosure.

FIG. 6 is a schematic structural diagram illustrating the reflective mirror to rotate along a direction perpendicular to the projection apparatus according to an embodiment of the present disclosure.

As illustrated in FIG. 6, the reflective mirror 602 is controlled to rotate along a direction perpendicular to the projection apparatus 601.

According to the above embodiments of the present disclosure, a person skilled in the art may clearly understand that the embodiments of the present disclosure may be implemented by means of hardware or by means of software plus a necessary general hardware platform. Persons of ordinary skill in the art may understand that all or part of the steps of the methods in the embodiments may be implemented by a program instructing relevant hardware. The program may be stored in a computer readable storage medium and may be executed by at least one processor. When the program runs, the steps of the methods in the embodiments are performed. The storage medium may be any medium capable of storing program codes, such as a read-only memory (ROM), a random-access memory (RAM), a magnetic disk, or a compact disc read-only memory (CD-ROM).

Finally, it should be noted that the above embodiments are merely used to illustrate the technical solutions of the present disclosure rather than limiting the technical solutions of the present disclosure. Under the concept of the present disclosure, the technical features of the above embodiments or other different embodiments may be combined, the steps therein may be performed in any sequence, and various variations may be derived in different aspects of the present disclosure, which are not detailed herein for brevity of description. Although the present disclosure is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present disclosure.

What is claimed is:

1. A projection method, applicable to a projection apparatus, wherein the method comprises:
  acquiring a target object image;
  identifying attribute information of a target object based on the target object image;
  acquiring preset projection content based on the attribute information of the target object;
  acquiring a projection path; and
  projecting a projection image based on the preset projection content and controlling the projection image to move along the projection path;
  the projection method further comprises:
  presetting a corresponding relationship among the attribute information of the target object, the projection content, and the projection path; and
  acquiring the projection path comprises:
  acquiring the projection path based on the attribute information of the target object and the corresponding relationship.

2. The projection method according to claim 1, wherein acquiring the projection path comprises:
  randomly generating a projection path; or
  acquiring a moving path of the target object, and acquiring the projection path based on the moving path.

3. The projection method according to claim 2, wherein the projection path comprises a key point, the key point comprising a starting point, a plurality of turning points, and a termination point;
  the projection apparatus comprises a motion control device, the motion control device being configured to move the projection image; and
  the method further comprises:
  presetting a rotation angle and a rotation speed of the motion control device corresponding to the key point.

4. The projection method according to claim 3, controlling the projection image to move along the projection path comprises:
  controlling the projection image to move along the projection path by controlling the rotation angle and the rotation speed of the motion control device.

5. The projection method according to claim 4, the projection apparatus comprises a lighting device; and
  the method further comprises:
  turning off the lighting device in response to the projection path being a projection path that is randomly generated, and in response to controlling the projection image to move along the projection path that is randomly generated.

6. The projection method according to claim 5, wherein the projection apparatus further comprises a lens and a focusing device, the lens being connected to the focusing device; the method further comprises: acquiring a corresponding relationship table by presetting a corresponding relationship between a projection distance and a focusing position of the lens; and conducting automatic focusing to the projection image comprises: acquiring a position of the projection image; determining the projection distance based on the position of the projection image; inquiring the focusing position of a lens corresponding to the projection distance in the corresponding relationship table; and controlling the focusing device to move the lens to the focusing position.

7. A projection apparatus, comprising:
a projecting device and a motion control device, the motion control device being configured to control the projecting device to move;
the projecting device comprising a lighting device, an image acquiring device, a lens, a focusing device, a controller;
wherein the lighting device is configured to supply a light source;
the image acquiring device is configured to acquire a target object image;
the focusing device is connected to the lens, and configured to drive the lens to move to a focusing position;
the controller is connected to the lighting device, the image acquiring device, and the focusing device;
wherein the controller comprises:
at least one processor; and
a memory communicably connected to the at least one processor; wherein
the memory is configured to store at least one instruction executable by the at least one processor, wherein the at least one instruction, when executed by the at least one processor, causes the at least one processor to perform the method as defined in claim 1.

8. The projection apparatus according to claim 7, wherein the projecting device further comprises a reflective mirror; wherein the reflective mirror is connected to the controller; and
the reflective mirror is configured to conduct rotation correction to the projection image.

9. A non-volatile computer-readable storage medium storing at least one computer-executable instruction, wherein the at least one computer-executable instruction, when executed by a processor, causes the processor to perform the method as defined in claim 1.

* * * * *